A. J. THOMPSON.
COW TAIL HOLDER.
APPLICATION FILED AUG. 21, 1916.
1,224,237.
Patented May 1, 1917.
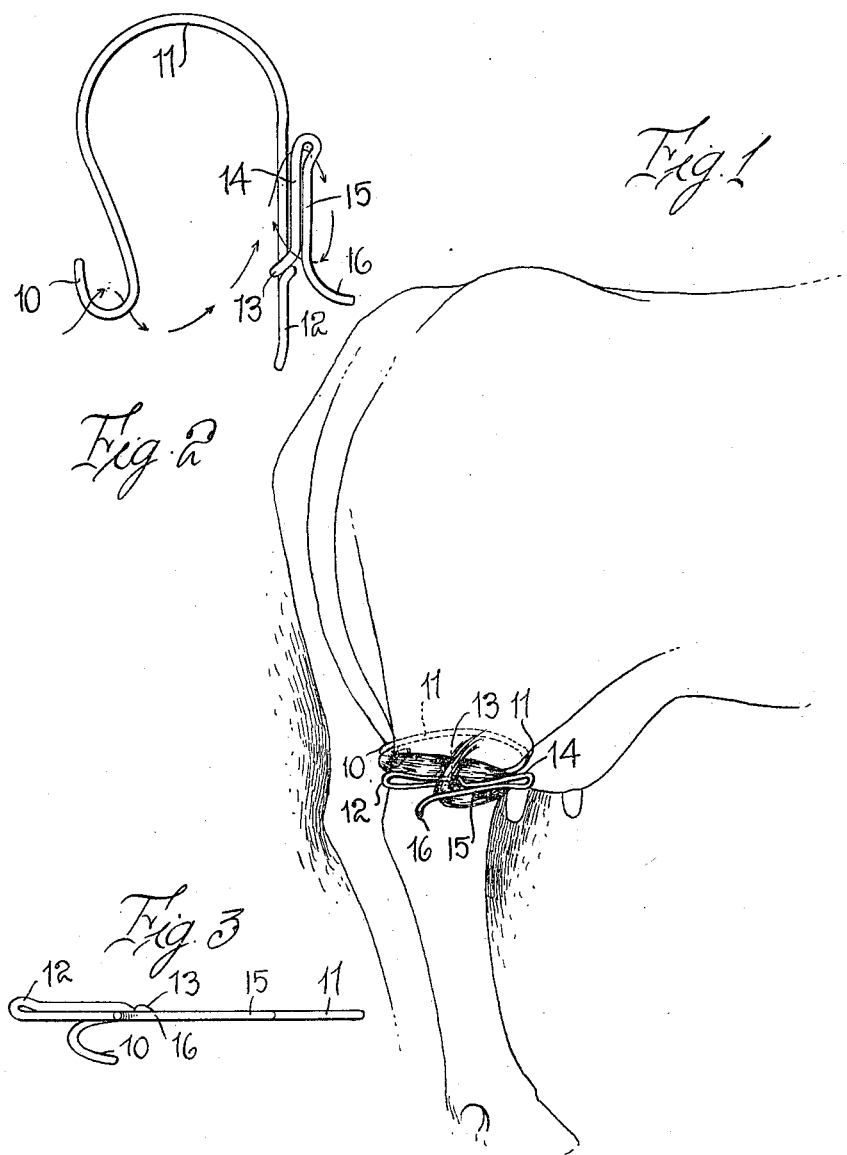
Inventor
ARTHUR J. THOMPSON
By Watson E. Coleman
Attorney

UNITED STATES PATENT OFFICE.

ARTHUR JAMES THOMPSON, OF ARGYLE, MICHIGAN.

COW-TAIL HOLDER.

1,224,237.   Specification of Letters Patent.   Patented May 1, 1917.

Application filed August 21, 1916. Serial No. 116,135.

*To all whom it may concern:*

Be it known that I, ARTHUR J. THOMPSON, a citizen of the United States, residing at Argyle, in the county of Sanilac and State of Michigan, have invented certain new and useful Improvements in Cow-Tail Holders, of which the following is a specification, reference being had to the accompanying drawings.

This invention relates to devices for holding tails of cows and other animals, and is particularly designed to be used during milking.

Generally speaking the device comprises a leg embracing member and a tail clip connected thereto, the tail clip and the leg embracing member being so arranged that the cow cannot draw her tail rearward and upward, the leg embracing member however, being loose on the leg of the cow.

A further object is to provide a device of this character which is very simply attached, is held in place by the tail itself and which may be very cheaply made.

My invention is illustrated in the accompanying drawings, wherein:

Figure 1 is a view showing my improved tail holder in applied position;

Fig. 2 is a plan view of the tail holder; and

Fig. 3 is a side view of the tail holder.

Referring to these figures it will be seen that this holder is formed of a single length of wire bent at one end as at 10 to form a hook or open loop into which the tail just above the wisp is to be inserted. The wire is then bent to form a relatively large approximately U-shaped open loop 11, designed to embrace the leg of an animal. The wire at the extremity of the loop 11 opposite the hook 10 is rebent as at 12 for a distance along the leg of the loop 11 and then twisted once and a quarter around the leg of the loop as at 13, then extended nearly parallel to the leg of the loop as at 14 to form a clip for engaging the wisp of the tail, the opening of this clip 14 being oppositely directed to the opening of the leg loop. The wire at the end of the portion 14 is again rebent or returned upon itself as at 15, extended approximately parallel to the portion 14 and then outwardly bent as at 16. The portions 14 and 15 are brought relatively close to each other so that they form a second tail clip. In the practical use of my invention the loop 11 is slipped on the leg of the cow with one hand and with the other hand the tail of the cow just above the wisp is inserted in the hook 10. The wisp of the tail is then brought across to the opposite side of the loop 11, as indicated by the arrows in Fig. 2, then the wisp is pulled down into the clip formed by the leg of the loop 11 and the portion 14 and then brought forward and upward between the portions 14 and 15. Thus this clip formed by the portions 14 and 15 forms a lock out of which it is practically impossible for an animal to disengage its tail.

It will be seen that this construction causes the tail to assist in holding the tail holder in place, but that the construction allows the holder to hang loosely on the leg so as to give the least possible annoyance to the cow. It is further to be noted that the opening or mouth of the loop 11 is wide enough so that it may be slipped on the leg easily and it is not necessary to spread it in order to place it on the leg.

It will be seen that while this device does not bind on the cow's leg, yet it holds the tail firmly and positively prevents any whisking of the tail.

The holder which I have illustrated is particularly designed to be applied to the right leg of a cow, but by reversing the hook 10 it will also apply to the left leg, or by making the hook 10 larger and not tilting the hook at an inclination to the plane of the body 11, the device may be applied to the other leg. The inclination of the hook 10 is such that the holder hangs loose on the tail. It does not bind the tail at the base of the wisp.

While I do not wish to be limited to the exact form of the device which I have illustrated, yet it is obvious that this may be very cheaply made and that it is thoroughly effective. The device does not bind on the cow's leg and does not really engage the leg of the cow until the cow attempts to switch her tail.

Having described my invention, what I claim is:

A tail holder formed of a single length of wire bent to form a relatively large open engaging loop, the arms of which are slightly convergent toward the open end of the loop, one of the arms being rebent to form an open hook adapted to engage the tail at the base of the wisp, the wire at the other end of the first named open loop being rebent approximately parallel to the adjacent leg of the loop, then twisted around the leg of the loop, then longitudinally extended toward the closed end of the loop, to form a resilient wisp engaging clip, the wire then being bent upon itself and extended toward the open end of the loop parallel to said clip and then being outwardly extended to form a second wisp engaging clip.

In testimony whereof I hereunto affix my signature in the presence of two witnesses.

ARTHUR JAMES THOMPSON.

Witnesses:
D. D. McNAUGHTON,
ALEX VAN SICKLE.

Copies of this patent may be obtained for five cents each, by addressing the "Commissioner of Patents, Washington, D. C."